(12) United States Patent
Takahashi

(10) Patent No.: US 7,317,495 B2
(45) Date of Patent: Jan. 8, 2008

(54) MOBILE TELEPHONE AND IMAGE RECEIVING DEVICE WITH REDUCED POWER CONSUMPTION

(75) Inventor: Naomichi Takahashi, Kakegawa (JP)

(73) Assignee: NEC Corporation (JP)

( * ) Notice: Subject to any disclaimer, the term of this patent is extended or adjusted under 35 U.S.C. 154(b) by 411 days.

(21) Appl. No.: 10/888,618

(22) Filed: Jul. 9, 2004

(65) Prior Publication Data

US 2005/0073617 A1  Apr. 7, 2005

(30) Foreign Application Priority Data

Jul. 10, 2003  (JP)  ............................ 2003-272858

(51) Int. Cl.
  *H04N 5/64*  (2006.01)
  *H04B 1/16*  (2006.01)
(52) U.S. Cl. ................ 348/838; 455/556.1; 455/343.2; 348/730
(58) Field of Classification Search ................ 348/837, 348/838, 180, 192, 193, 726, 730; 455/556.1, 455/161.3, 343.1, 343.2; 375/345; 340/7.33, 340/7.32
  See application file for complete search history.

(56) References Cited

U.S. PATENT DOCUMENTS

| | | | | |
|---|---|---|---|---|
| 3,584,307 | A | * | 6/1971 | Hewie .................... 455/163.1 |
| 5,144,296 | A | * | 9/1992 | DeLuca et al. ............ 340/7.35 |
| 5,701,599 | A | * | 12/1997 | Aihara ..................... 455/186.1 |
| 5,966,186 | A | * | 10/1999 | Shigihara et al. ........... 348/570 |
| 6,236,674 | B1 | | 5/2001 | Morelli et al. .............. 375/219 |
| 6,650,376 | B1 | * | 11/2003 | Obitsu ........................ 348/730 |
| 6,741,293 | B1 | * | 5/2004 | Obuchi ....................... 348/554 |
| 6,754,468 | B1 | * | 6/2004 | Sieben et al. .............. 455/41.2 |
| 6,993,357 | B1 | * | 1/2006 | Ito et al. ................... 455/552.1 |
| 7,106,382 | B2 | * | 9/2006 | Shiotsu ...................... 348/555 |
| 7,146,185 | B2 | * | 12/2006 | Lane ....................... 455/552.1 |
| 2004/0204041 | A1 | * | 10/2004 | Fillebrown et al. ....... 455/556.1 |

FOREIGN PATENT DOCUMENTS

| | | |
|---|---|---|
| EP | 0 310 379 | 9/1988 |
| JP | 1-103977 | 7/1989 |
| JP | 1-132184 | 9/1989 |
| JP | 06311079 | 4/1994 |
| JP | 2000-188557 | 7/2000 |
| JP | 2002-354359 | 12/2002 |
| JP | 2003-069910 | 3/2003 |
| JP | 2003-158691 | 5/2003 |

* cited by examiner

*Primary Examiner*—Victor R. Kostak
(74) *Attorney, Agent, or Firm*—Hayes Soloway P.C.

(57) ABSTRACT

In a portable receiving device 1 operable with a battery 18 as power supply and capable of receiving the TV broadcast outdoors, a CPU 13 detects the receiving level of the TV receiving unit 12 at timings set in the timer 24, compares the receiving level with a preset threshold level, turns off, when the receiving level becomes lower than a threshold level, the power supply to the TV receiving unit 12, subsequently detecting and performs, when the receiving level subsequently exceeds a threshold level, a control for resuming the power supply to the receiving unit 12. Thus, the power consumption in the TV receiving unit 12 when the TV radio wave receiving status is deteriorated is reduced.

9 Claims, 8 Drawing Sheets

FIG. 2(a) USER'S OPERATION
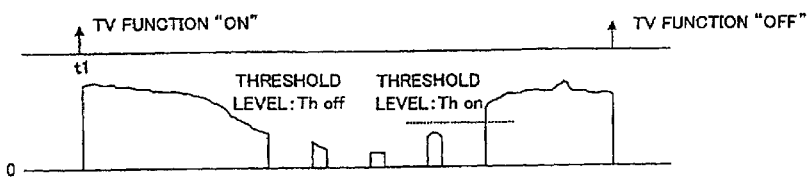
FIG. 2(b) TV SIGNAL RECEIVING LEVEL
FIG. 2(c) RECEIVING LEVEL OBSERVATION TIMING
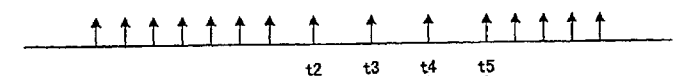
FIG. 2(d) TV RECEIVING UNIT POWER SUPPLY CONTROL
FIG. 2(e) OBSERVATION CONTROL DURING TV RECEIVING UNIT POWER SUPPLY "ON"
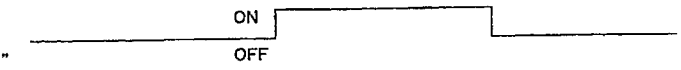
FIG. 2(f) LCD DISPLAY CONTENT
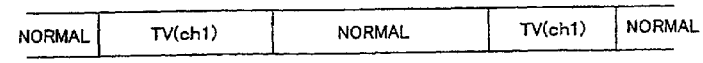
FIG. 2(g) AUDIO OUTPUT
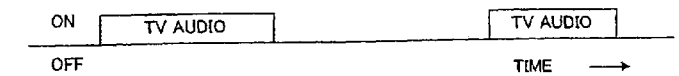

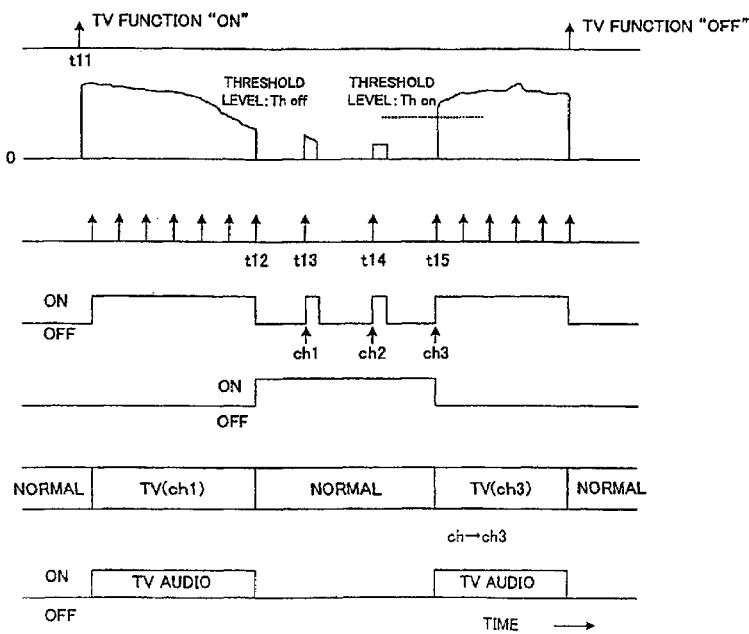

FIG. 6 (a) RECEIVING LEVEL OBSERVATION TIMING
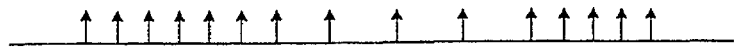
FIG. 6 (b) PORTABLE TELEPHONE SET BASE STATION RETRIEVAL TIMING
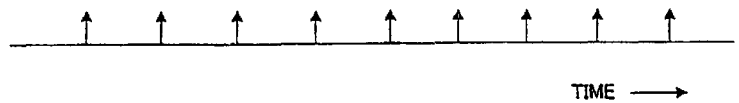
TIME ⟶

PRIOR ART
FIG. 7 (a) USER'S OPERATION
FIG. 7 (b) TV SIGNAL RECEIVING LEVEL
FIG. 7 (c) TV RECEIVING UNIT POWER SUPPLY
FIG. 7 (d) LCD DISPLAY CONTENT
FIG. 7 (e) AUDIO OUTPUT
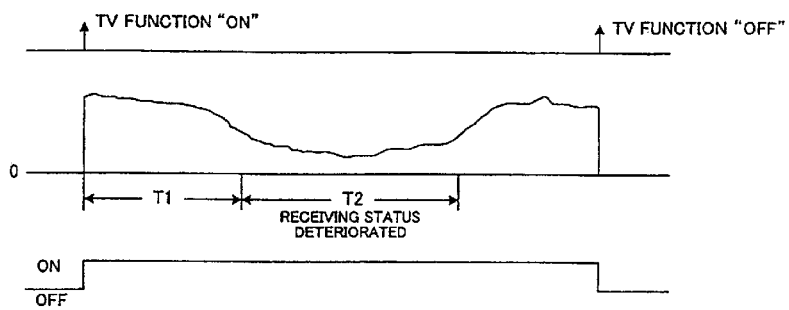

PRIOR ART
FIG. 8 (a) USER'S OPERATION
↑ TV FUNCTION "ON"
FIG. 8 (b) TV SIGNAL RECEIVING LEVEL
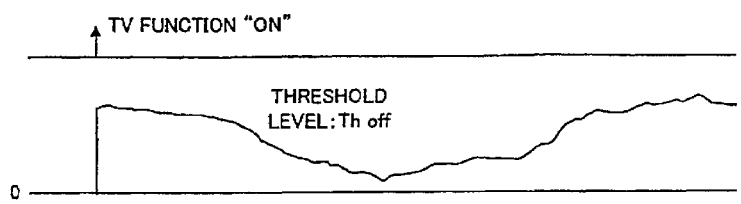
THRESHOLD LEVEL: Th off
FIG. 8 (c) TV RECEIVING CIRCUIT POWER SUPPLY
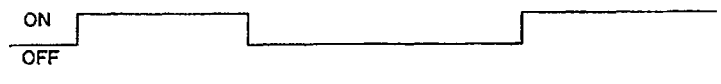
FIG. 8 (d) TV RECEIVING UNIT POWER SUPPLY
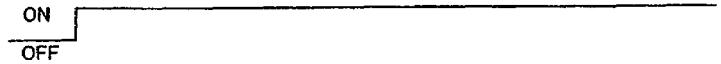
FIG. 8 (e) LCD DISPLAY CONTENT
| NORMAL | TV(ch1) | NO DISPLAY | TV(ch1) |
FIG. 8 (f) AUDIO OUTPUT
TIME →

MOBILE TELEPHONE AND IMAGE RECEIVING DEVICE WITH REDUCED POWER CONSUMPTION

BACKGROUND OF THE INVENTION

This application claims benefit of Japanese Patent Application No. 2003-272858 filed on Jul. 10, 2003, the contents of which are incorporated by the reference.

The present invention relates to portable image receiving devices and portable terminal devices such as portable image receiving devices capable of extending the life time of a power supply battery.

In our current daily life, telephones and televisions (TV) receivers have become essential electronic devices. Various portable models of these devices have been developed with advancement of semiconductor techniques and realization of both color and improved performance liquid crystal displays (LCD). Portable image receiving devices capable of television reception have been reduced in size and weight such that they are now capable of being put on a palm-sized device with realization of image display on a display unit (such as LCD) of several inches.

The portable telephone, PHS (personal handy-phone system) telephones and PDA (personal digital assistant) devices also have reduced in size and weight and have extended usage times. Particularly, mobile telephones and PHS telephones have been improved with size and weight reduction down to 100 grams and standby battery life extensions of about 500 hours. These improvements have been outstandingly popular.

However, as of now, most of the above portable devices are not integrated into one unit. And, even devices adapted to provide multiple functions in the same unit mostly incorporate several, subordinate functions that are intrinsic main functions. For example, a mobile phone may have an electronic telephone diary function, a mail function, a memo function, a game function, etc. that are provided together with the telephone functions.

Recently, high density fitting has become possible with semiconductor devices, and mobile phones and PHS telephone sets with additional digital camera functions are commercially available and popular. Thus, it is probable that composite devices having a plurality of main functions will increase in number in the future. Particularly, it is probable that with realization of their size and weight reduction, devices having both telephone functions and TV receiving functions become popular products in the future.

However, TV functionality in a mobile device requires high consumption current and the broadcast is often received for long time. Therefore, when a battery is used as power source for a portable television, the broadcast can be received for at most only about two hours from the fully charged state of the battery. Due to this limited length of possible broadcast reception time, the integration of television functions within mobile, phones and the like has not been commercially viable. For example, in the case of a mobile phone with TV functions, the telephone functions would be useless after a 2 hour television broadcast. Thus, it is necessary to reduce the consumed current in these devices as much as possible during television operation.

FIGS. 7(a) to 7(e) show the operation of one type of prior art portable image receiving device. When the power supply is turned on, as shown in FIG. 7(a), by operation of a power supply switch in the portable image receiving device, a TV receiver is furnished with power as shown in FIG. 7(c), and reception of TV waves is thus begun. When the portable receiving device is used outdoors, the radio wave receiving status is influenced in dependence on such factors as the place of reception, and the reception level is subject to variations. Particularly, the reception level is subject to variations in reception while the unit is moving. When the radio wave receiving status is good and the reception level is high as in a time section T1 in FIG. 7(b), both the TV video and TV audio can be reproduced without noise, and no problem arises in the TV reception. However, when the portable receiving device is moved, the radio wave receiving status is deteriorated as in time section T2 in FIG. 7(b). When the TV reception level becomes lower than a certain level, as shown in FIGS. 7d and 7e, noise becomes noticeable in both the TV video and audio. In this status, the TV broadcast reception is no longer good.

However, the circuitry of the prior art portable receiving device is constructed such that it reproduces both the TV video and audio at all times irrespective of the radio wave receiving status so long as the power supply is "on". In other words, even the radio wave receiving status is so bad that TV broadcast reception is no longer good, the power is still supplied to all the circuits in the device. Thus, in the device using a battery as power supply, the battery is drained even when broadcast reception is poor. Several prior art devices attempt to remedy this problem.

FIGS. 8(a) to 8(f) show the operation of a prior art portable receiving device with the control of the power supply based on the radio wave receiving status. In this operation, after the power supply has been turned on as shown in FIG. 8(a), the electric field intensity of audio signal during the TV reception is observed (i.e., detected), and when the detected electric field intensity becomes lower than a predetermined threshold level, the power supply to the TV audio and video receiving circuits is turned off as shown in FIG. 8(c). Thus, the video and audio outputs are brought to zero as shown in FIGS. 8(d) and 8(e). When the detected electric field intensity exceeds the threshold level, the power supply to the TV audio receiving circuit and a TV video receiving circuit and is turned on, thus reducing the consumed current in the device (see Literature 1: Japanese Utility Model Laid-open Heisei 01-103977).

Another TV receiver has been proposed, in which the end of broadcast is decided by checking whether or not received waves are present, and after the lapse of a predetermined period of time from the cessation of the received waves is detected, the power supply is entirely is turned off (see Literature 2: Japanese Utility Model Laid-open Heisei 01-132184).

However, these prior art television receivers, require observation of the reception level at all times, including when the power supply to the TV audio and video receiving circuits are "off". This means that the circuit for receiving the TV signal wastefully drains current from the power supply, e.g., the battery.

Additionally, in the prior art devices, stable TV signal reception may not be obtained when the device is moving due to increased noise which detracts from the user's enjoyment of the TV reception. Although TV reception can be enjoyed when radio waves are received, current is consumed by the receiving system circuit despite the lack of reception, and the same can not be enjoyed until the radio wave reception is good. Consequently, batteries for these devices wear-out quickly.

And, while the TV function may be turned off by the user when noise is increased, the TV function must be turned back on to see whether the radio wave receiving status is good. Thus, portable TV devices that reduce current consumption as much as possible while also taking the user's convenience into consideration are needed.

SUMMARY OF THE INVENTION

An object of the present invention is to provide portable receiving device and portable terminal device capable of control of the power supply based on the TV radio wave receiving status to reduce the consumed current and extend the allowable time of their use.

According to an aspect of the present invention, there is provided a portable image receiving device operable with a battery as a power supply and capable of receiving television (TV) broadcast, comprising: a receiving unit for receiving the TV broadcast and generating a video and an audio signal; and a control unit for detecting, during the operation of the receiving unit, the TV signal receiving level by the receiving unit at a predetermined time interval, turning off the power supply to the receiving unit when the receiving level becomes lower than a preset permissible level, detecting, after the power supply turn-"off", the receiving level by intermittently operating the receiving unit at a predetermined time interval and receiving the power supply to the receiving unit when the receiving level is higher than a permissible level.

The control unit includes a storing unit for storing data as to whether the power supply has been turned off manually, and when the power supply has been turned off, the process of the receiving level detection and the power supply resumption control are not made after the power supply turn-"off". The control unit sets a threshold level for comparing the receiving level and checks whether the receiving level is below or above the threshold level. The control unit does not allow the audio output to a loudspeaker or the like and the video output to the display unit.

According to another aspect of the present invention, there is provided a portable terminal device having a telephone function having a radio unit for performing radio transmission and reception for mobile communication and a TV function having a receiving unit for receiving television (TV) broadcast and generating a video and an audio signal, either one of the two functions being selectable for use by the user, a battery being used as operation power supply, comprising: a control unit for detecting, during the operation of the receiving unit in the selection of the TV function, for detecting, during the operation of the receiving unit, the TV signal receiving level by the receiving unit at a predetermined time interval, turning off the power supply to the receiving unit when the receiving level becomes lower than a preset permissible level, detecting, after the power supply turn-"off", the receiving level by intermittently operating the receiving unit at a predetermined time interval and receiving the power supply to the receiving unit when the receiving level is higher than a permissible level.

The control unit includes a storing unit for storing data as to whether the TV function has been manually turned off, and when the TV function is found to be manually turned off, the receiving level detecting process after the power supply cut-"off" and a control for resuming the power supply are not permitted. The control unit detects, after the power supply to the receiving unit has been turned off, the receiving level by changing the broadcast channel to be received whenever the receiving unit is intermittently operated.

The telephone function corresponds to the portable telephone or PHS (personal handy-phone system) and the control unit synchronizes the receiving level detection timing to the base station retrieval timing in the portable telephone or PHS.

According to other aspect of the present invention, there is provided a control method of a portable image receiving device operable with a battery as power supply and capable of receiving the TV broadcast comprising steps of: detecting receiving level of the by a TV receiving unit; comparing the receiving level with a preset threshold level; turning off, when the receiving level becomes lower than the threshold level, the power supply to the TV receiving unit, subsequently detecting and performing, when the receiving level subsequently exceeds a threshold level; and resuming the power supply to the receiving unit.

With the above portable image receiving device and portable terminal device, when the receiving unit is in operation, it detects the TV receiving level at a predetermined time interval. When the receiving level is below a permissible level, the power supply thereto is turned off, and thereafter it is operated intermittently at a predetermined interval. When the subsequent receiving level is above the permissible level, the power supply to the receiving unit is resumed. Since the power supply to the receiving unit is turned off when the TV receiving status turns to be unsuitable to the TV, it is possible to correspondingly reduce the consumed power and extend the allowable time of TV reception enjoyment.

Other objects and features will be clarified from the following description with reference to attached drawings.

BRIEF DESCRIPTION OF THE DRAWINGS

FIGS. 2(a)-(g) show an operation of the portable receiving device shown in FIG. 1;

FIGS. 5(a)-(g) show the operation in the case of successively switching the TV receiving channel in the portable terminal device 30 shown in FIG. 3;

FIGS. 6(a)-(b) show the relation between the TV signal receiving level observation timing and the base station retrieval timings in the portable telephone set;

FIGS. 7(a) to 7(e) show the operation of a prior art portable image receiving device; and FIGS. 8(a) to 8(f) show an operation of a prior art portable receiving device with the control of the power supply based on the radio wave receiving status.

PREFERRED EMBODIMENTS OF THE INVENTION

Preferred embodiments of the present invention will now be described with reference to the drawings.

Figure 1:
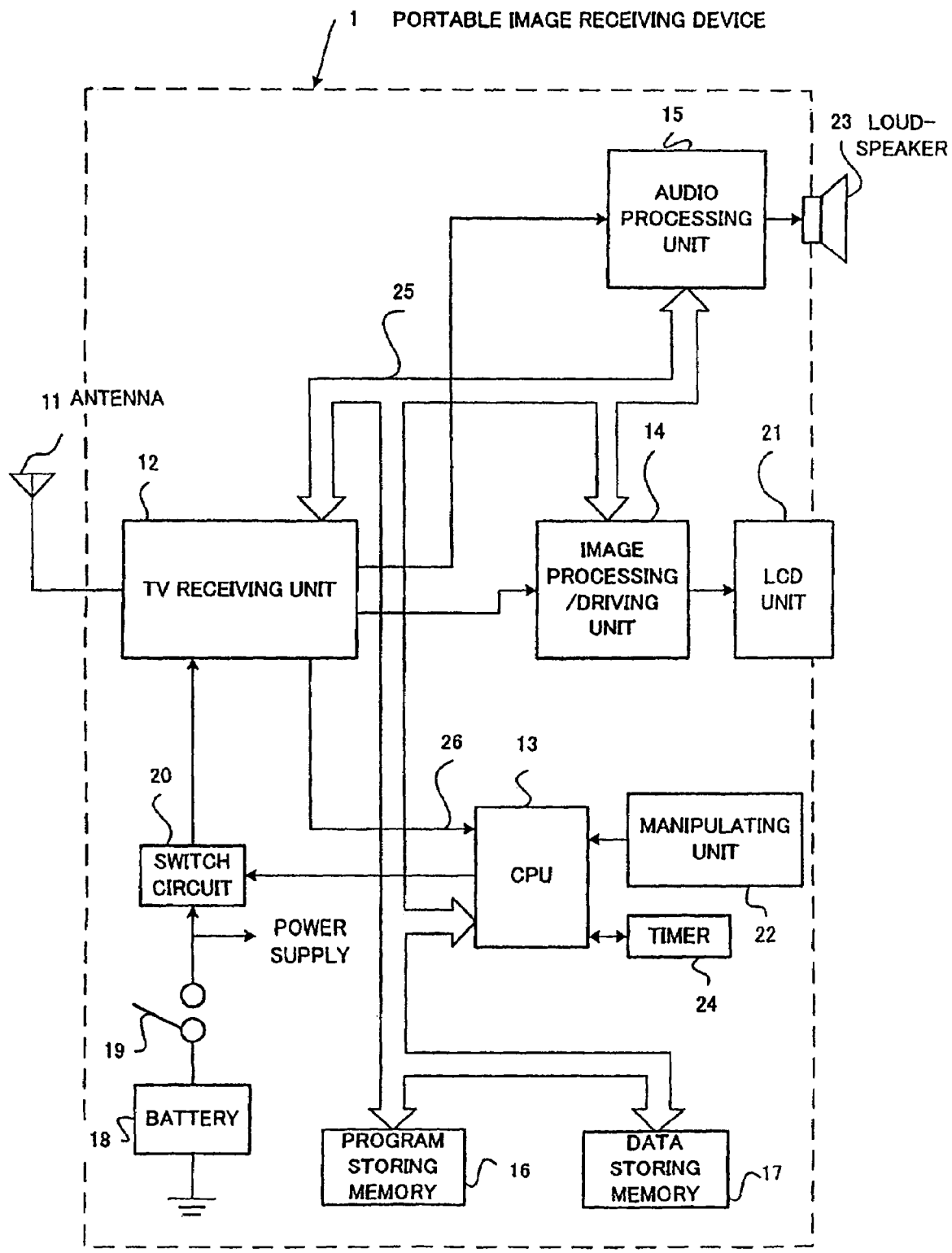
FIG. 1 shows a first embodiment of a portable image receiving device according to the present invention.

FIG. 1 shows a first embodiment of the portable image receiving device according to the present invention. The portable image receiving device 1 comprises an antenna 11, a TV receiving unit 12 (abbreviated as receiving unit), a CPU 13, an image processing/driving unit 14, an audio processing unit 15, a program storing memory 16, a data storing memory (or memory unit) 17, a battery 18 as power supply, a power supply switch 19, a switch circuit 20, an LCD (liquid crystal display) unit 21, a manipulating unit 22, a loudspeaker 23 and a timer 24. Reference numeral 25 designates a bus inter-connecting the CPU 13 and other circuits for digital processing. The CPU 13 and the switch circuit 20 together constitute a control unit.

The antenna 11 has a property of covering a frequency band, by which all the television broadcast channel frequencies can be received, and it may, for instance, be an extensible rod antenna. It is possible to connect or provide an external connection antenna to permit high sensitivity reception. The TV receiving unit 12 includes a tuner unit, a video intermediate frequency amplifier, a video detector, etc., and operates in synchronism to a channel designated by the manipulating unit 22. The CPU 13, e.g., a one-chip microcomputer, controls the portable receiving device 1 as a whole based on a program stored in the program storing memory 16 and executes controls according to contents set in the manipulating unit 22.

The image processing/driving unit 14 includes a video amplifier, a video signal generator, a sync. signal generator, etc. and further a drive circuit for driving the LCD display unit 21 based on the video signal and sync. signals (i.e., horizontal and vertical sync. signals), and it is connected to the TV receiving unit 12. The audio processing unit 15 drives the loudspeaker 23 by amplifying an audio detection signal from the TV receiving unit 12. The loudspeaker 23 executes electric-to-acoustic conversion and outputs audio.

The program storing memory 16 may be a ROM (read-only memory), in which programs for operating the portable receiving device 1 are stored. The data storing memory 17 is a semiconductor memory for storing selected channel data, threshold data and other data.

The battery 18 is a secondary battery capable of being re-charged or a consumable dry battery, and can supply power to various circuits via the power supply switch 19. The switch circuit 20 may be a relay or an electronic switch for executing the on-off switching of the power supply from the battery 18 to the TV receiving unit 12.

The LCD display unit 21 includes an LCD unit, a back light, etc., and is driven by the video processing/driving unit 14 for display operation. The manipulating unit 22 is connected to the CPU 13, and includes a volume adjuster, a sound quality adjuster, etc. as well as channel selection buttons (or keys) and channel scanning buttons, etc. The timer 24 is connected to the CPU 13, and sets a time for determining a receiving level observing cycle.

FIGS. 2(*a*)-2(*g*) show the operation of the portable receiving device shown in FIG. 1. As shown in waveform 2(*a*), at time t1 the power switch 19 is turned on by the user of the portable receiving device 1, and the TV function is turned on by manipulating the manipulating unit 22. As shown in waveform 2(*d*), on the basis of this operation, the CPU 13 turns on the switch circuit 20 to supply from the power supply 18 to the TV receiving unit 12. Simultaneously with the turn-"on" of the power supply switch 19, circuits other than the TV receiving unit 12 are supplied with power.

With the operation of the TV receiving unit 12 and the other circuits as described above, as shown in waveform 2(*f*), video data that has been processed in the video processing/driving unit 14 is displayed on the LCD display unit 21. And, as shown in waveform 2(*g*), audio data processed in the audio processing unit 15 is outputted from the loudspeaker 28. In this way, TV broadcast reception can be enjoyed in the normal state.

As soon as TV reception has begun, as shown in waveform 2(*e*), the receiving level of TV signal 26 from the TV receiving unit 12 is observed. The CPU 13 compares the receiving level of the observed waveform 2(*b*) and a threshold level (Thoff) stored in the data storing memory 17. When the TV signal receiving level is higher than the threshold level (Thoff), the CPU 13 decides that the TV radio wave receiving status is good and, as shown in waveform 2(*e*), continuously observes the receiving level at according to a time signal from the timer 24.

When the receiving level as shown in waveform 2(*c*) is lower than the threshold level (Thoff), the CPU 13 controls a TV receiving unit power supply control signal as shown in waveform 2(*d*) to turn off only the power supply to the TV receiving unit 12. As shown in waveforms 2(*f*) and 2(*g*) the CPU 13 controls that neither TV audio signal nor TV video signal is provided. At this time, a normal waiting display is provided on the display unit 21. The audio output is reduced to zero.

When the TV function is turned off, the level observation/non-observation data during the TV function "off" state is stored in the data storing memory 17. Since the TV function has been turned off without user's manipulation but automatically, the level observation/non-observation data in this case is stored as "OBSERVATION" state. When the observation/non-observation data represents the "OBSERVATION" state, as shown in FIG. 2(*d*), after the power supply to the TV receiving unit 12 has been turned off, it is subsequently turned on tentatively at time signals (t2, t3, t4) provided by the timer 24, and the receiving level of the TV signal as shown in waveform 2(*c*) is observed. In this case, the observation time interval is set longer than when the power supply is in the "on" state of the TV receiving unit 12 so as to reduce the number of times it is necessary to intermittently turn on the power supply.

The observation/non-observation data indicates whether function is off due to user selection or whether the received TV signal doesn't meet the threshold required and the system has shut down independently of the user's input. In other words, TV function is turned off by the user's selection, the observation/non-observation data is set to the "NON-OBSERVATION" state, observation of the receiving level of the TV signal does not occur. Alternatively, when TV function has automatically turned off without user input, the observation/non-observation data is set to the "OBSERVATION" state, and the CPU 13 carries out receiving level observation of the TV signal while the TV function is off.

At time t2 to t4, the receiving level of the TV signal 26 of the waveform 2(*e*) and the threshold level (Thon) stored in the data storing memory 17 are compared. At time t2 to t4, at which the receiving level of the TV signal 26 is lower than the threshold level (Thon), the CPU 13 decides that the TV radio wave receiving status remains deteriorated, and the receiving level is continuously at each time provided by timer 24.

Upon reaching time t5, where according to waveform 2(*b*) the receiving level is higher than the threshold level (Thon), the CPU 13 determines that the TV receiving status is good. Thus, as shown in waveform 2(*d*), CPU 13 controls the switch circuit 20 to have the power supply to the TV receiving unit 12 "on" at all times. The CPU 13 also controls the TV audio data to be outputted to the loudspeaker 23, controls the TV video data to be outputted to the LCD display unit 21, and restores the TV reception state, as shown by waveforms 2(*f*) and 2(*g*). The CPU 13 switches the observation/non-observation data during the TV function "off" state to the "NON-OBSERVATION" state.

When the user of portable receiving device 1 turns off the TV function, the power supply to the TV receiving unit 12, or when such control as tuning off the TV audio and video outputs is made, the receiving level observation is not made until the user turns on the TV function again.

As shown above, so long as the portable receiving device 1 is "on", the receiving level in the TV receiving unit 12 is observed at the time set by the timer 24, and a determination as to whether the power supply to the TV receiving unit 12 is to be "on" or "off" is made by comparing the receiving level with the threshold level. In other words, when the state of received waves has deteriorated, the TV receiving unit 12 is automatically turned off, while it is automatically turned on when the receiving status returns to an acceptable level. It is thus possible to reduce the consumed current in the "off" state of the TV function.

Figure 3:
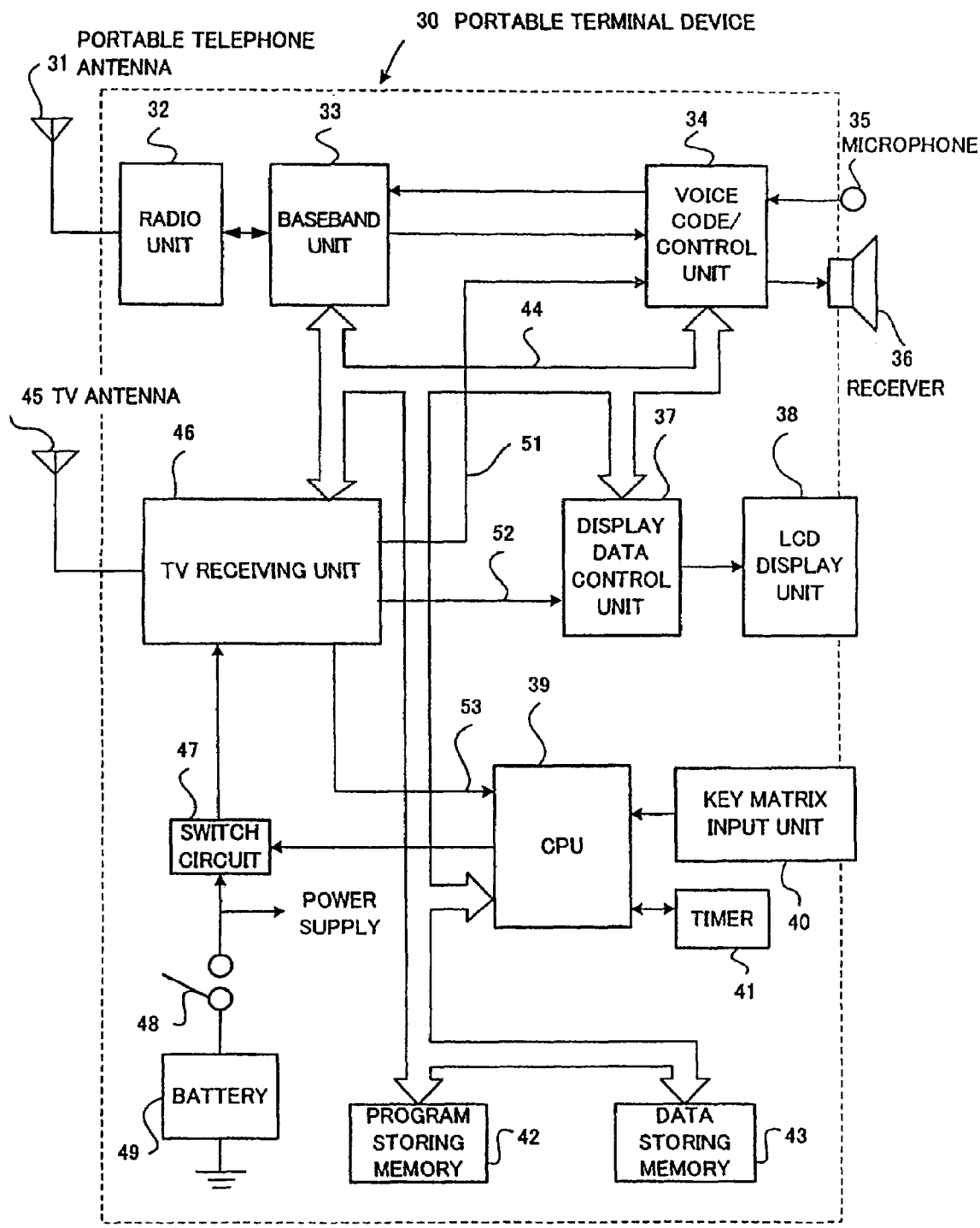
FIG. 3 shows an arrangement of a second embodiment of the present invention applied to a portable terminal device.

FIG. 3 shows the arrangement of a second embodiment of the present invention applied to a portable terminal device. Here a portable telephone set with TV function will be described as portable terminal device. The portable terminal device 30 shown in FIG. 3 comprises a portable telephone unit, a TV function unit and a battery 49 as power supply.

The portable telephone set includes an antenna 31 for portable telephone unit, a radio unit 32, a baseband unit 33, a voice CODE/control unit 34, a microphone 35 as transmitter, a receiver (or loudspeaker) 36, a display data control unit 37, an LCD display unit 38, a CPU 39, a key matrix input unit 40 as a manipulating unit, a timer 41, a program storing memory 42 and a data storing memory (or memory unit) 43. Reference 44 designates a bus, which interconnects the CPU 39 and other circuits for executing digital processing. The bus 44 includes an address bus, a data bus and a control bus. The TV function unit comprises a TV antenna 45, a TV receiving unit (or merely referred to as receiving unit) 46, a switch circuit 47 and a power supply switch 48. The CPU 39 and the switch circuit 47 together constitute a control unit.

The portable terminal device 30 may look like the typical mobile phone, i.e., it could be in the shape of foldable type "flip" phone, a bar phone, etc. When the LCD display unit 38 provides telephone functionality the display unit 38 displays the telephone number, mail contents, down-load contents, contents of input from the key matrix 40, etc. The display size of the LCD display unit 38 is about 2 inches for the portable telephone. When the TV function is executed, the TV receiving device is displayed. And, antenna 31 for portable telephone and the antenna 45 for TV are desirably separated from each other to avoid interference.

The antenna 31 for portable telephone includes an internal antenna such as a rod antenna and an internal antenna such as an F type antenna. The antenna 45 for TV is an extensible rod antenna having a characteristic of covering a frequency band, in which all the TV broadcast channel frequencies can be received. It is possible to further provide an external antenna for obtaining high sensitivity reception The radio unit 32 includes such circuits as a transmitting/receiving circuit for transmitting and receiving signal in a wave form corresponding to a PDC (personal digital cellular) system or a DMA (code division multiple access) system in an 800, 1,500, etc. MHz band and a modulating/demodulating circuit. The baseband unit 33 converts a signal from the audio CODEC/control unit 34 to a signal format for transmitting the converted signal to the radio unit 32, and also converts a demodulated signal from the radio unit 32 to a digital receiver audio outputted to the receiver 36.

The audio CODEC/control unit 34 converts the received digital audio signal from the baseband 33 to an analog signal to be outputted as receiver audio from the receiver 36, and digitalizes the analog transmitter audio signal from the microphone 35. The audio CODEC/control unit 34 processes the audio signal from the TV receiving unit 46 for driving the receiver 36. The display data control unit 37 executes a process for displaying TV video signal (i.e., generating video signal and horizontal and vertical sync signals) from the output of the TV receiving unit 46 on the LCD display unit 35 and also a process for displaying the telephone number of the portable telephone set and mails on the LCD display unit 38. The LCD display unit 38 includes an LCD unit, a back light, etc., and is driven for display by the display data control unit 37.

The CPU 39 may be constructed by using a one chip, a micro-computer, etc., and executes control of the portable terminal device 30 as a whole based on programs stored in the program storing memory 42 and also control based on the contents set in the key matrix 40. For example, the CPU 39 controls the writing of data in the data storing memory 43 and also various circuits connected to the bus 44 by reading out the data from the memories 42 and 43. The key matrix 40 has numeral figure buttons of "0" to "9", symbol buttons of "#" and "*", various function selection buttons, channel scan button, etc. The timer 41 sets a time for determining the cycle of receiving level observation when executing the TV function.

The program storing memory 42 may be a ROM (read only memory), in which programs for the execution of telephone function and TV function in the portable terminal device 30. The data storing memory 43 may be a flash memory or other similar semiconductor memory, in which the selected channel data, threshold level data, electronic telephone diary of portable telephone set, mail contents, call arrival data, memo data, record contents and other data is stored.

The TV receiving unit 46 includes a tuner unit, a video intermediate frequency amplifier, a video detector, etc., and operates to be tuned to a broadcast channel designated by the key matrix 40. The battery 49 may be a rechargeable secondary battery or a dry cell, and can supply power to various circuits via the power supply switch 48. The switch circuit 47 is constructed by using a relay or an electronic circuit. Also, according to an instruction from the CPU 39, it executes the on-off switching of the power supply from the power supply 49 to the TV receiving unit 46.

When the portable terminal unit 30 is used as a mobile phone, an analog transmission audio signal inputted from the microphone 35 is digitalized by the audio CODE/control unit 34. The digitalized transmission audio signal is converted in the baseband unit 33 to a signal format in a radio section of the phone, and then modulated in the radio unit 32 to be supplied as radio wave from the antenna 31 to be reviewed by the base station.

In reverse radio waves from the base station are received by antenna 31 for the mobile phone, then modulated in the radio unit 32, and processed in the baseband unit 33 to a digital received audio signal. The digital received audio signal is converted in the audio CODEC/control unit 34 to an analog signal, which is output as received audio from the receiver 36. When the portable terminal unit 30 is used as a mobile phone, the CPU 39 drives the switch circuit 47 to disconnect the TV receiver unit 46 and the battery 49 from each other to prevent generation of power-consuming current in the TV receiver unit 46.

Now, the operation in case when the portable terminal device 30 is operated as TV receiver by using the TV function will be described. The TV signal received by the TV antenna 45 is outputted through the TV receiving unit 46 separately as TV audio and video signals 51 and 52. The TV audio and video signals 51 and 52 are outputted as analog signals. The TV audio signal 51 is inputted to the audio CODEC/control unit 34, and when TV function is executed, execution the TV broadcast audio signal is outputted to the receiver 36.

The TV video signal 52 is inputted to the display data control unit 37. The display data control unit 37 converts the TV video signal 52 from analog to digital data and then outputs the digital data to the LCD display unit 38, and the TV video signal is displayed on the LCD display unit 38. When TV function is executed, the CPU 39 controls the radio unit 32 and the baseband unit 33 via the bus 44 to an intermittently receiving state (i.e., a state in which the base station is intermittently retrieved).

The observation/non-observation data is data as to whether the TV signal receiving level observation is to be carried out in the TV function "off" state. When the user turns the TV function off, the observation/non-observation data is set to "NON-OBSERVATION", and the TV receiving level is not observed. When the TV function is turned off automatically without any user's operation, the observation/non-observation data is set to "OBSERVATION", and the TV signal receiving level is observed in the TV function "off" state.

Figure 4:
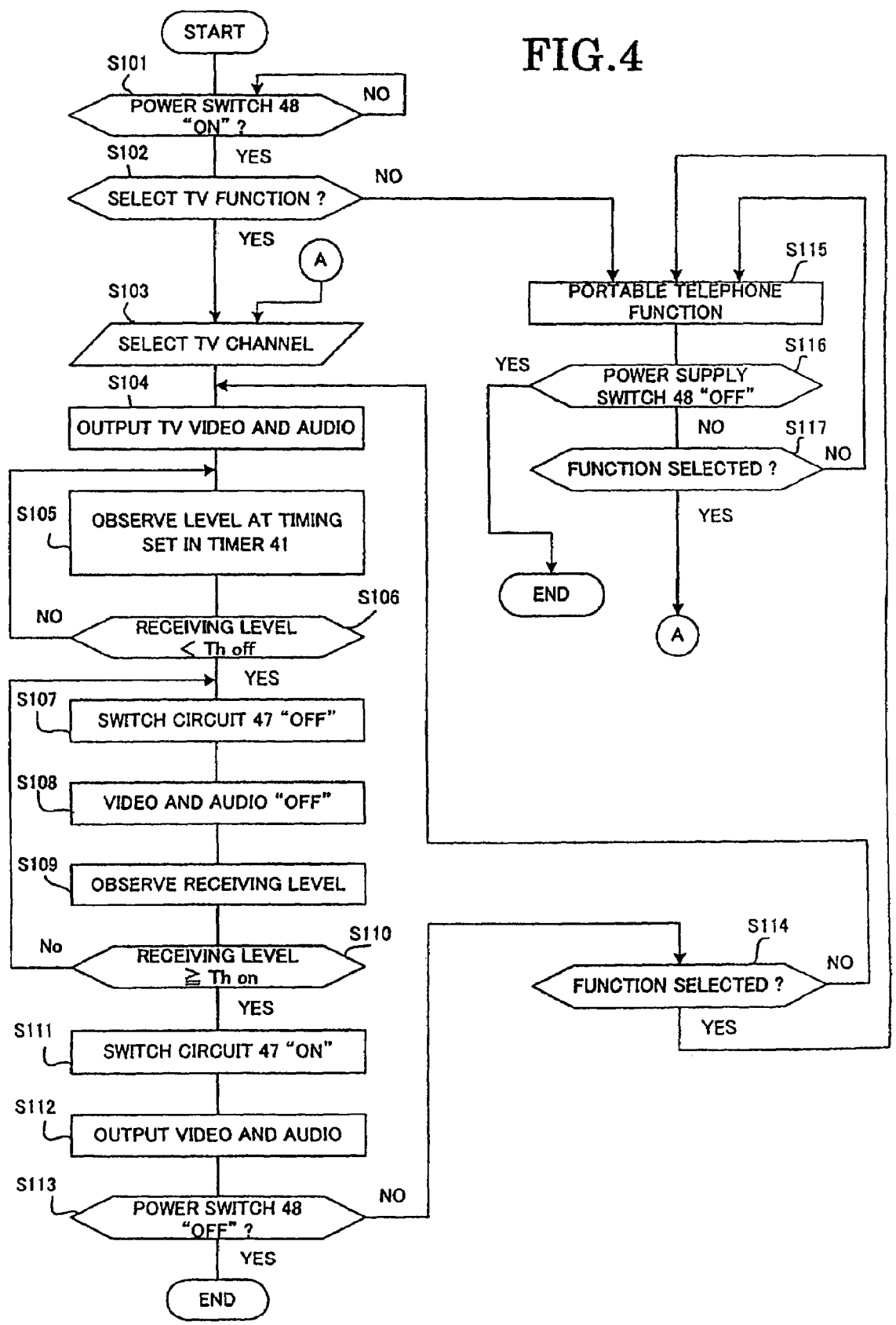
FIG. 4 shows the operation of the portable terminal device 30 shown in FIG. 3.

FIG. 4 illustrates the operation of the portable terminal device 30 shown in FIG. 3. In the Figure, symbol "S" means a step. The operation in the case of using the TV function of the portable terminal device 30 will now be described with reference to FIGS. 2 and 3 as well as FIG. 4.

Then, the operation of the portable terminal device 30 shown in FIG. 3 will be described with reference to FIGS. 3 and 4 as well as FIGS. 2(a)-2g). When the user turns on the power supply switch 48 (step S101), power is supplied to the circuit including the TV receiving unit 46, and it is possible to select the telephone function or the TV function. When the user selects the TV function (S102), a broadcast channel can be selected by manipulating the key matrix 40 (step S103). When the channel is selected, the TV receiving unit 46 starts reception, causing the CPU 39 to control the audio CODEC/control unit 34, the display data control unit 37, etc., thus making it possible to receive the TV broadcast (step S104).

When the TV reception is started, the CPU 39 observes the receiving level of the TV signal 53 at times set in the timer 41 (S105) as shown in waveform 2(c). At every time set by the timer 41, the CPU 39 observes the receiving level of the output of the TV receiving unit 46 as shown in waveform 2(b). The CPU 39 compares the observed receiving level and the threshold level (Thoff) stored in the data storing memory 43 (step S106). When the receiving level as shown in waveform 2(b) is higher than the threshold level (Thoff), the CPU 39 decides that the radio wave receiving status is good, and continues the video and audio outputs and the observation based on the timer 41.

When the receiving level 53 outputted from the TV receiving unit 46 is less than "Thoff", the CPU 39 decides that the TV radio wave receiving status has deteriorated and, as shown in waveform 2(d), controls switch circuit 47 to turn off the power supply to the TV receiving unit 46 (step S107). Once off, the power supply is only momentarily turned on at the times set by timer 41. At this time, the CPU 39 also prohibits the output of the TV audio and video signals (step S108). In the LCD display unit 38, the normal waiting display is made. When the TV function is turned off, the level observation/non-observation data in the TV function "off" state is stored in the data storing memory 43. In this case, since the power supply has been turned off automatically without users operation the observation/non-observation data is stored as "OBSERVATION" state in the data storing memory 43.

When the observation/non-observation data is "OBSERVATION", even after the power supply of the TV receiving unit 46 has been turned off, the CPU 39 causes the receiving unit 46 to be observed by momentarily turning on the power supply to the TV receiving unit 8 at each tiring set in the timer 41 (step S109). The CPU 39 compares the observed level and the threshold level (Thon) stored in the data storing memory 43 (step S110). When the level of the TV received signal 53 shown as waveform 2(b) is lower than the threshold level (Thon) ("No"), the CPU 39 decides that the TV radio wave receiving status has deteriorated, and continuously observes the receiving level at each time set by the timer 41.

When the level of the TV receiving signal 53 is higher than the threshold level (Thon) ("Yes"), the CPU 39 decides that the TV radio wave receiving status is now good, and controls the switch circuit 47 to connect the battery 49 and the TV signal receiving unit 46 to each other so as to have the TV receiving unit 46 continuously "on" (step S111). At the same time, as shown in waveforms (e) and (f), the CPU 39 causes the TV audio to be output to the receiver 36 and also causes the TV video to be output to the LCD display unit 38 (step S112). Thus, the portable device is brought to a state ready for enjoying the TV reception. At this time, the CPU 39 inverts the observation/non-observation data in the data storing memory 43 in the TV function "off" state to the "NON-OBSERVATION" state.

In the subsequent TV receiving state, the receiving level is not observed until the user turns on the TV function again (step S103) after the user has turned off the TV function of the portable terminal device 30 (step S114) or the power supply to the TV receiving unit 46 or after the CPU 39 has controlled to prohibit the output of the TV audio and video. When the power supply switch 48 is turned off while the TV function is in force (step S113), the power supply to the portable terminal device 30 is turned off.

When the telephone function is selected in the step S102, the portable terminal device 30 can be used as a normal mobile phone. By inputting the telephone number the process for telephone communication can be executed. Further, it is possible to provide a memory function, a mail function, etc. by carrying out a designated operation. When the power supply switch 48 is turned off during the execution of the telephone function (step S116), the power supply to the portable terminal device 30 is turned off. When the TV function is selected (step S117), the routine goes to the step S103 to execute the process for the process of the TV reception.

As has been described in the foregoing, when the TV wave status has deteriorated such that the TV function is automatically turned off during TV reception, the receiving level is observed at times set by the timer 41 for on-off control of the power supply to the TV receiver unit 46 on the basis of comparison with the threshold level. Thus, even in the portable terminal device 30 with TV function, it is possible to reduce the consumed current in the TV function "off" state thereby reducing the current consumption in the portable terminal device 30, and extending the time for using the portable terminal device 30 so as to enjoy TV reception for long time even in an environment changing receiving levels.

FIGS. 5(a)-5(f) show the operation in the case of successively switching the TV receiving channel in the portable terminal device 30 shown in FIG. 3. By successively switching the TV receiving channels it is possible to quickly retrieve a good receiving status wave and obtain quicker restoration of the TV receiving state. The setting of a TV receiving channel can be such that the CPU 39 sets the channel in the TV receiving unit 46 via the bus 44 with reference to the TV channel setting data stored in the data storing memory 43.

As shown as waveform 5(*f*), it is assumed that channel 1 (ch1) is first selected at the time of execution of the TV function. In this case, during the TV reception the TV radio wave receiving status is observed at a time set by the timer 41. In the course of observation, the receiving level of the TV signal 53 from the TV receiving unit 46 and the threshold level (Thoff) are compared. When the TV wave status has deteriorated at time t12, the CPU 39 decides that the receiving level is lower than the threshold level (Thoff), and stops supplying power to the TV receiving unit 46.

The receiving status may not always be the same for all channels, and depending on the receiving frequency band, the receiving level may not be deteriorated or only slightly deteriorated. Accordingly, when it is acceptable to change the channel to one where TV reception is obtainable, as shown, in FIG. 5(*b*) this change is executed after the power supply to the antenna 45 for the TV receiving unit has been turned off.

When the TV receiving unit 46 is in the "off" state, the CPU 39 sets the observation/non-observation data to "OBSERVATION", and causes the switch circuit 47 to be turned on intermittently at time by the timer 41 for advanced reception of TV broadcast change signal and observation of the receiving status. As shown in waveform 5(*d*), the channel number is progressively changed to, for instance, "ch1" at time t13, "ch2" at time t14 and "ch3" at time t15, and with each change the receiving status is observed.

As shown in waveform 5(*b*), when the receiving status is good at the time of reception of channel "ch3" at time t5, the result of observation of the receiving status is that the receiving level 53 is higher than the threshold level (Thon). Thus, the CPU 39 turns on the switch circuit 47 to supply the power from the battery 49 to the TV receiving unit 46 so as to turn on the unit 46, thus starting the TV reception at "ch3" as shown in waveforms 5(*f*) and 5(*g*).

FIG. 6 shows the relationship between the TV signal receiving level observation timing and the base station retrieval timing in the portable telephone set. Usually, in a portable telephone set, base station retrieval is made at a constant cycle during the wait operation. It is possible to make this timing and the TV signal receiving level observation timing the same. By making both timings the same, it is possible to reduce the timer resources in the portable terminal device 30.

In the above embodiments it is assumed that the threshold levels (Thoff) and (Thon) are the same, but these levels may be different as well. Also, while different timing is set by the timers 24 and 41 at the time of the TV reception (i.e., power supply to the TV receiving units 12 and 46), these timings may be the same as well.

Furthermore, while the display unit is constructed by using the LCD, it is also possible to use a display based on a different operation principle for display, for instance a plasma display.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

The invention claimed is:

1. A portable image receiving device operable with a battery as a power supply and capable of receiving a television broadcast signal, comprising:
   a TV receiving unit including image and audio processing units for receiving the television broadcast signal and generating from the television broadcast signal video and audio signals; and
   a control unit for controlling power to said TV receiving unit, detecting, wherein said control unit evaluates the television broadcast signal strength and turns off the power supply to said image and audio processing units when the broadcast signal strength becomes lower than a preset permissible level and after the power supply to said image and audio processing units is turned off, said control unit periodically checks said signal strength by intermittently evaluating the television broadcast signal at predetermined times, and re-connects the power supply to the image and audio processing units when it is determined that the broadcast signal strength is higher than a permissible level.

2. The portable receiving device according to claim 1, wherein the control unit includes a storing unit for storing data as to whether the power supply has been turned off manually, and for maintaining power to said receiving unit "off" when the power supply has been turned off manually.

3. The portable receiving device according to claim 1, wherein the control unit sets a threshold level for comparing the receiving level and checks whether the receiving level is below or above the threshold level.

4. The portable receiving unit according to claim 1, wherein the control unit restricts the audio output to a loudspeaker and restricts the video output to the display unit.

5. A portable terminal device having a telephone function with a radio for performing radio transmission and reception for mobile communication and a TV function with a receiving unit including image and audio processing units for receiving television (TV) signals and generating video and audio signals from said television signal, either one of the two functions being selectable for use by the user, a battery being used as operation power supply, comprising:
   a control unit for controlling power to said image and audio processing units, wherein said control unit evaluates the television signal strength and turns off the power supply to said image and audio processing units when the signal strength becomes lower than a preset permissible level, and after the power supply is turned off, said control unit periodically checks said signal strength intermittently at predetermined times, and re-connects the power supply to the image and audio processing units when it is determined that the signal strength is higher than a permissible level.

6. The portable terminal unit according to claim 5, wherein the control unit includes a storing unit for storing data as to whether the image and audio processing units have been manually turned off, and for maintaining power to said receiving unit when the image and audio processing units are found to be manually turned off.

7. The portable terminal device according to claim 6, wherein the control unit detects, after the power supply to the image and audio processing units has been turned off, the receiving level by changing the broadcast channel to be received whenever the receiving unit is intermittently operated.

8. The portable terminal device according to claim 5, wherein:

the telephone function corresponds to the portable telephone or PHS (personal handy-phone system); and the control unit synchronizes the receiving level detection timing to the base station retrieval timing in the portable telephone or PHS.

9. A control method of a portable image receiving device operable with a battery as a power supply and capable of receiving and processing a television signal TV:

detecting a television signal strength by a TV receiving and processing unit which includes image and audio processing units;

comparing the signal strength with a preset threshold level;

turning off, when the receiving level becomes lower than the threshold level, the power supply to the image and audio processing units of the TV receiving unit, periodically re-connecting the power supply to the receiving unit to detect whether the receiving level exceeds a threshold level; and resuming the power supply to the image and audio processing units of the TV receiving unit once the strength exceeds the threshold.

\* \* \* \* \*